United States Patent
Siddiqui

(10) Patent No.: US 6,744,624 B2
(45) Date of Patent: Jun. 1, 2004

(54) HAND-HELD PERSONAL COMPUTER

(75) Inventor: Kabir Siddiqui, Sammarnish, WA (US)

(73) Assignee: Microsoft Corporation, Redmond, WA (US)

( * ) Notice: Subject to any disclaimer, the term of this patent is extended or adjusted under 35 U.S.C. 154(b) by 101 days.

(21) Appl. No.: 10/071,308

(22) Filed: Feb. 8, 2002

(65) Prior Publication Data

US 2003/0151887 A1 Aug. 14, 2003

(51) Int. Cl.[7] .................................................. G06F 1/16
(52) U.S. Cl. .................. 361/683; 361/680; 379/433.11; 379/440
(58) Field of Search ................................. 361/680, 683; 345/179; 379/428.01, 440

(56) References Cited

U.S. PATENT DOCUMENTS

| | | | | |
|---|---|---|---|---|
| 5,151,946 A | * | 9/1992 | Martensson | 455/550 |
| 5,896,277 A | * | 4/1999 | Leon et al. | 361/814 |
| 6,099,051 A | * | 8/2000 | Murphy et al. | 292/283 |
| D445,409 S | * | 7/2001 | Segers | D14/138 |
| 6,269,537 B1 | * | 8/2001 | Kimura et al. | 29/832 |
| 6,469,910 B2 | * | 10/2002 | Lefort | 361/814 |
| 6,545,577 B2 | * | 4/2003 | Yap | 335/205 |

* cited by examiner

Primary Examiner—Darren Schuberg
Assistant Examiner—Anthony Q. Edwards
(74) Attorney, Agent, or Firm—Merchant & Gould, LLC

(57) ABSTRACT

An improved hand-held computing device is provided. The hand-held computing device includes a slidably retractable keyboard and battery compartment cover having a pair of elongate slide members extending from opposing edges of the cover. The slide members extend into a casing of the hand-held computing device for attaching the cover to the computing device. Each of the elongate slide members has a detent defined along a forward portion of the slide member for engaging a detent catch disposed in the interior of the casing for retaining the slide members from exiting from the casing and separating from the casing when the cover is retracted to an open position. A pair of ball assemblies is provided for allowing the slide members to slidably insert into and retract from the casing. The battery compartment includes an interior battery cover for closing the battery recess to prevent the battery from dislodging from the battery recess when the keyboard and battery compartment cover is in an open position. The battery includes a generally rectangular shaped battery cell having an upper surface and a lower surface and having a rounded forward end member connecting a forward edge of the upper surface with a forward edge of the lower surface. The battery also includes a battery removal member defined along a rear upper edge of the upper surface. A stylus assembly is also provided.

28 Claims, 12 Drawing Sheets

HAND-HELD PERSONAL COMPUTER

FIELD OF THE INVENTION

This invention relates in general to personal electronic devices, such as hand-held personal computers, personal digital assistants, and the like.

BACKGROUND OF THE INVENTION

In recent years, growing numbers of personal electronic devices, such as wireless telephones, pagers, personal digital assistants, hand-held personal computers, and the like are being used extensively for business education and leisure. As technology advances allow for the components of such devices to be made smaller, such as miniaturized circuitry, improved screen technology, improved antenna technology, etc., the demand for smaller personal electronic devices that fit within a user's pocket, briefcase or purse has increased dramatically. With miniaturized design and construction of personal electronic devices, such as hand-held personal computers, it has become more difficult to integrate keyboards, display screens, function keys, and stylus mechanisms without increasing the overall size and weight of the device.

It is with respect to these and other considerations that the present invention has been made.

SUMMARY OF THE INVENTION

In accordance with the present invention, the above and other problems are solved by an improved hand-held computing device. The hand-held computing device of the present invention may include a number of personal electronic devices such as a hand-held personal computer or personal digital assistant. The hand-held computing device includes a slidably retractable keyboard and battery compartment cover having a pair of elongate slide members extending from opposing edges of the cover. The slide members extend into a casing of the hand-held computing device for attaching the cover to the computing device. A keyboard is disposed along a lower front portion of the computing device and a battery compartment is disposed along a lower back portion of the computing device. The keyboard and the battery compartment are uncovered for access by slidably retracting the cover away from the casing of the hand-held computing device.

The retractable cover includes a hollow cavity for receiving and enclosing the lower portion of the computing device when the cover is in a closed position. When the cover is in closed position, the keyboard and the battery compartment are hidden from access and view. Each of the elongate slide members has a detent defined along a forward portion of the slide member for engaging a detent catch disposed in the interior of the casing for retaining the slide members from exiting from the casing and separating from the casing when the cover is retracted to an open position.

The computing device of the present invention also includes a pair of ball assemblies for allowing a slide member to slidably insert into and retract from the casing. Each of the pair of ball assemblies includes a ball, a ball support and a ball retaining arm. The ball is maintained in engagement with an inner surface of the slide members. The ball retaining arm applies spring action against the ball structure for maintaining the ball in engagement with the inner surface of the slide members during movement of the slide members.

According to another aspect of the present invention, the battery compartment includes a generally rectangular-shaped battery recess for enclosing a battery for powering the computing device. The battery compartment further includes an interior battery cover for closing the battery recess to prevent the battery from dislodging from the battery recess when the keyboard and battery compartment cover is in an open position. The battery cover has a first side and a second side and each of the slide members have an elongate track running along a length of each of the slide members along an inner side near the upper edge of each of the slide members. An edge of first side of the interior battery cover is slidably mounted within the elongate track of the first slide member, and an edge of the second side of the interior battery cover is slidably mounted within the elongate track of the other slide member. The interior battery cover is slidably retractable to an open position by sliding the interior battery cover away from the battery recess and into the retracted keyboard and battery compartment cover.

The interior battery cover also includes an interior battery cover closing member defined along a rear edge of the interior battery cover. The closing member is engaged by an interior surface of the keyboard and battery compartment cover such that the interior battery cover is closed by slidably closing the keyboard and battery compartment cover, and thereby, pushing the closing member by engagement of the keyboard and battery compartment cover with the closing member. When the interior battery cover is pushed to a closed position, the closing member engages a stop member defined along the rear of the battery recess to prevent the interior battery cover from moving past a closed position.

The battery compartment of the computing device includes a battery for powering the computing device. The battery includes a generally rectangular shaped battery cell having an upper surface and a lower surface and having a rounded forward end member connecting a forward edge of the upper surface with a forward edge of the lower surface. The battery also includes a battery removal member defined along a rear upper edge of the upper surface. The battery is removed from the battery compartment by lifting the battery removal member upward and by rotating a rear end of the battery upward about an access formed along the rounded forward end member.

The computing device of the present invention also includes a stylus assembly mounted in the interior of a casing of the computing device. The stylus assembly includes an elongate stylus having a first end and a second end. The first end is generally point shaped, and a circumferentially defined detent is located near the second end. The stylus assembly also includes a stylus release catch for engaging the detent to detain the stylus inside the casing of the computing device. The assembly also includes a spring-loaded stylus release button for disengaging the stylus release catch from the detent. The stylus release catch is defined at a forward end of a stylus release, and the stylus release button is disposed along an outer surface of the stylus release. A spring guide is mounted in the interior portion of the casing of the computing device in engagement with an inner surface of the stylus release. Downward movement of the stylus release against the spring guide urges the stylus release catch outward and disengages the stylus release catch from the detent. A lower spring assembly is provided for engaging the first end of the stylus and for urging the stylus out of the casing of the computing device when the stylus release catch is disengaged from the detent.

These and other features and advantages, which characterize the present invention, will be apparent from a reading of the following detailed description and a review of the associated drawings. It is to be understood that both the foregoing general description and the following detailed description are exemplary and explanatory only and are not restrictive of the invention, as claimed.

DETAILED DESCRIPTION OF THE PREFERRED EMBODIMENT

Figure 1:
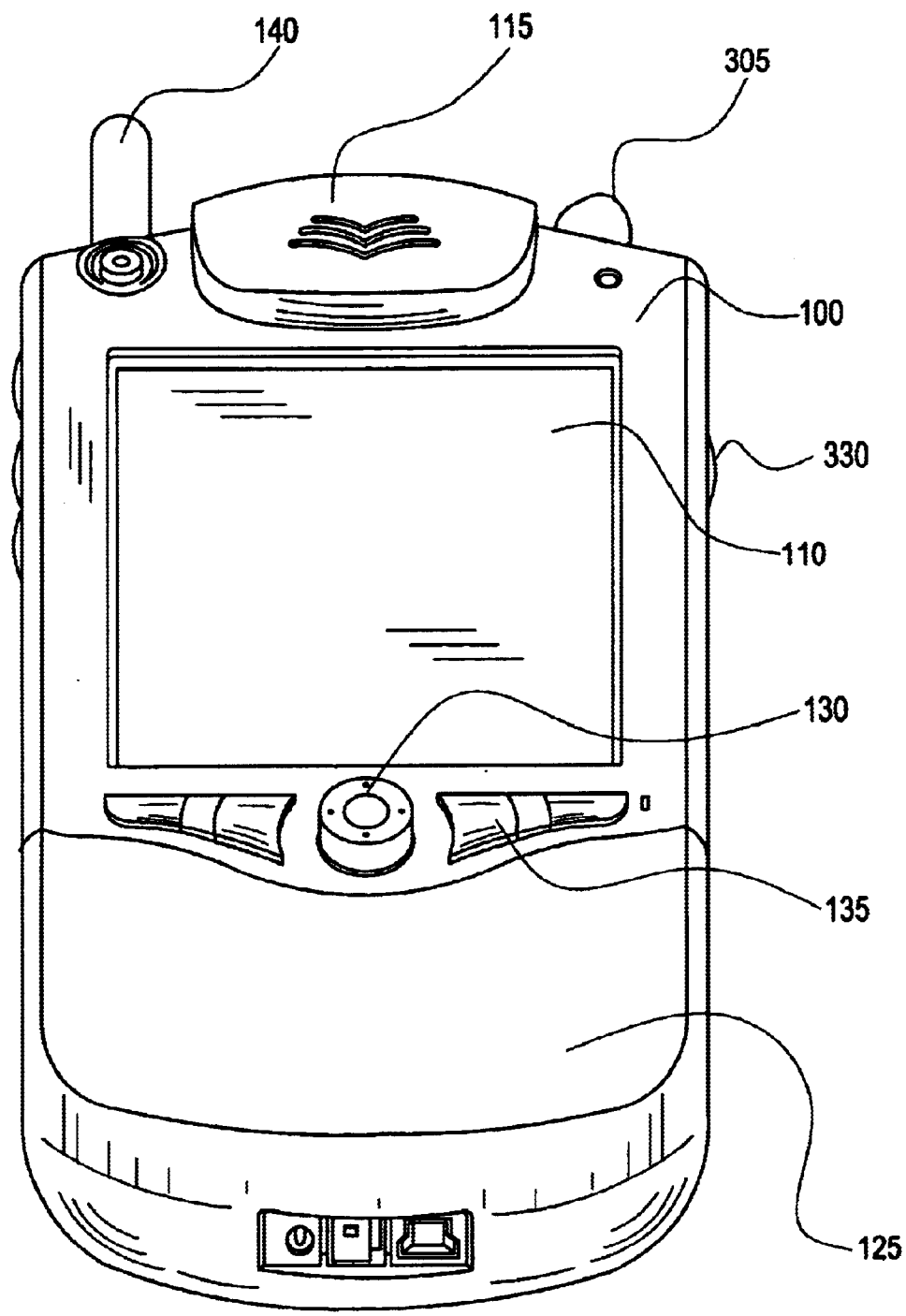
FIG. 1 is a pictorial perspective view of an illustrative hand-held personal computer according to an embodiment of the present invention.

The following description of an embodiment of the present invention is made with reference to the above-described drawings wherein like numerals refer to like parts or components throughout the several figures. The present invention is directed to an improved hand-held computing device. The hand-held computing device 100 illustrated in FIG. 1 is illustrative of a number of different personal electronic devices. Description of a hand-held computer herein encompasses any small or handheld electronic device, such as a personal digital assistant, pager, wireless telephone, etc. For purposes of the following description, the hand-held personal computer illustrated in FIG. 1 includes a computing device with a keyboard and display screen that may also function as a wireless telecommunications device and paging device. A stylus mechanism is included, described below, that may be used to deploy a stylus for input via direct contact between the stylus and the display screen.

FIG. 1 is a pictorial perspective view of an illustrative hand-held personal computer according to an embodiment of the present invention. The hand-held personal computer 100 of FIG. 1 includes a display screen 110 and antenna 140. A speaker 115 is disposed along the upper edge of the front portion of the computer 100 for presenting audible information to the user. A set of function keys 130, 135 are defined along the front of the computer beneath the display screen 110. A stylus 300 is inserted into the casing of the computer 100 opposite of the antenna 140. A keyboard and battery cover 125 is disposed along the bottom portion of the computer 100. As described in detail below, the keyboard and battery cover 125 is adapted to slidably retract from the main housing of the computer 100 to expose a keyboard defined along the front lower section of the computer 100 and to expose a battery compartment along the lower back section of the computer 100.

Figure 2:
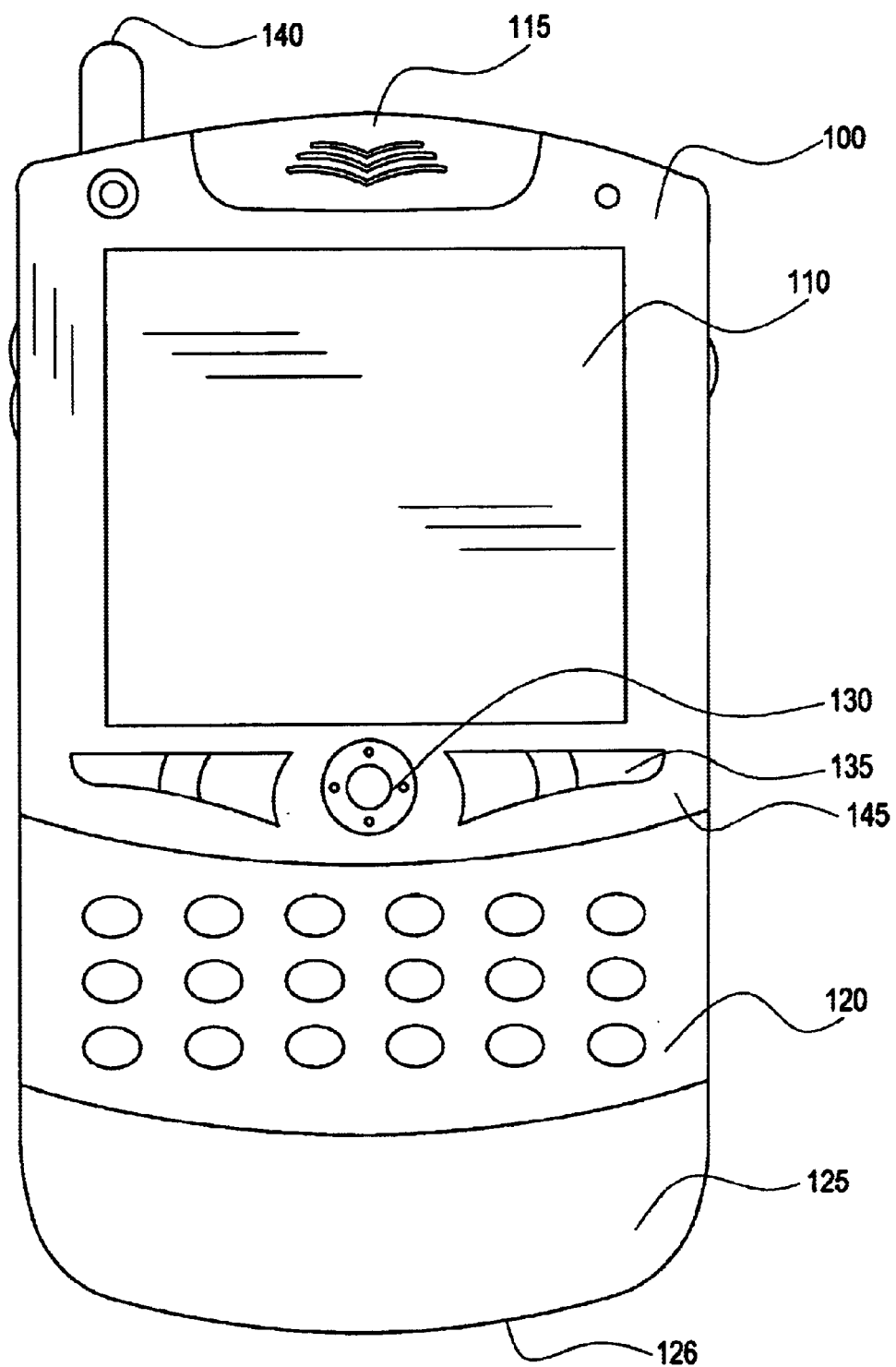
FIG. 2 is a top plan view of the hand-held personal computer of FIG. 1 showing a keyboard and battery cover in a deployed position exposing a keyboard for use.

FIG. 2 is a top plan view of the hand-held personal computer of FIG. 1 showing a keyboard and battery cover in a deployed position exposing a keyboard for use. According to an embodiment of the present invention, the keyboard and battery cover 125 may be retracted away from the main housing 145 of the hand-held computer 100 in order to expose a keyboard 120 for use by the user of the computer. When the keyboard and battery cover 125 are in the retracted position, as illustrated in FIG. 2, the lower edge 126 of the keyboard and battery cover 125 may be placed in the palm of the user's hand to support the computer 100 while the user depresses keys on the keyboard 120.

Figure 3:
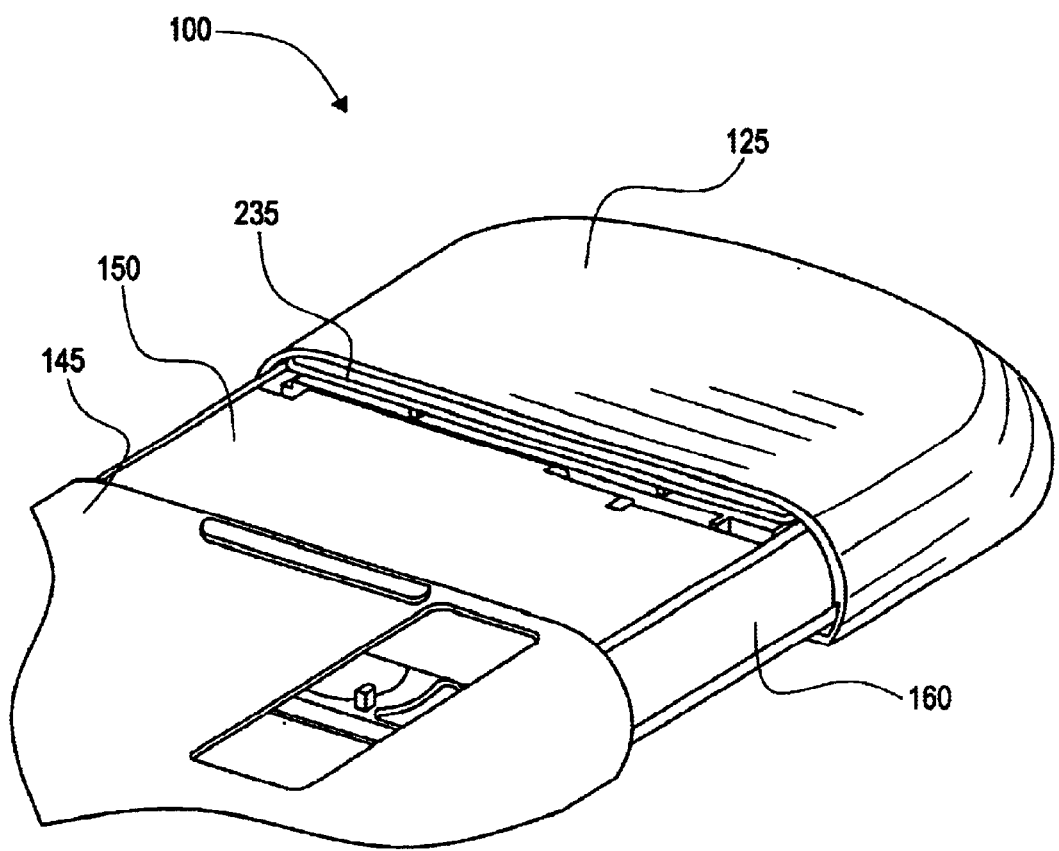
FIG. 3 is a partial perspective view of the hand-held personal computer of FIG. 1 showing a keyboard and battery cover in a deployed position exposing a battery to view.

FIG. 3 is a partial perspective view of the hand-held personal computer of FIG. 1 showing a keyboard and battery cover in a deployed position exposing a battery to view. The keyboard and battery cover 125 may be retracted away from the main housing 145 of the hand-held personal computer to expose a battery 150 inserted into a battery compartment located on the back side of the computer 100. According to an embodiment of the present invention, the keyboard and battery cover 125 is slidably retracted away from the main housing 145 of the computer 100 by sliding the keyboard and battery cover slide members 160 out of and away from the main housing 145.

Figure 4:
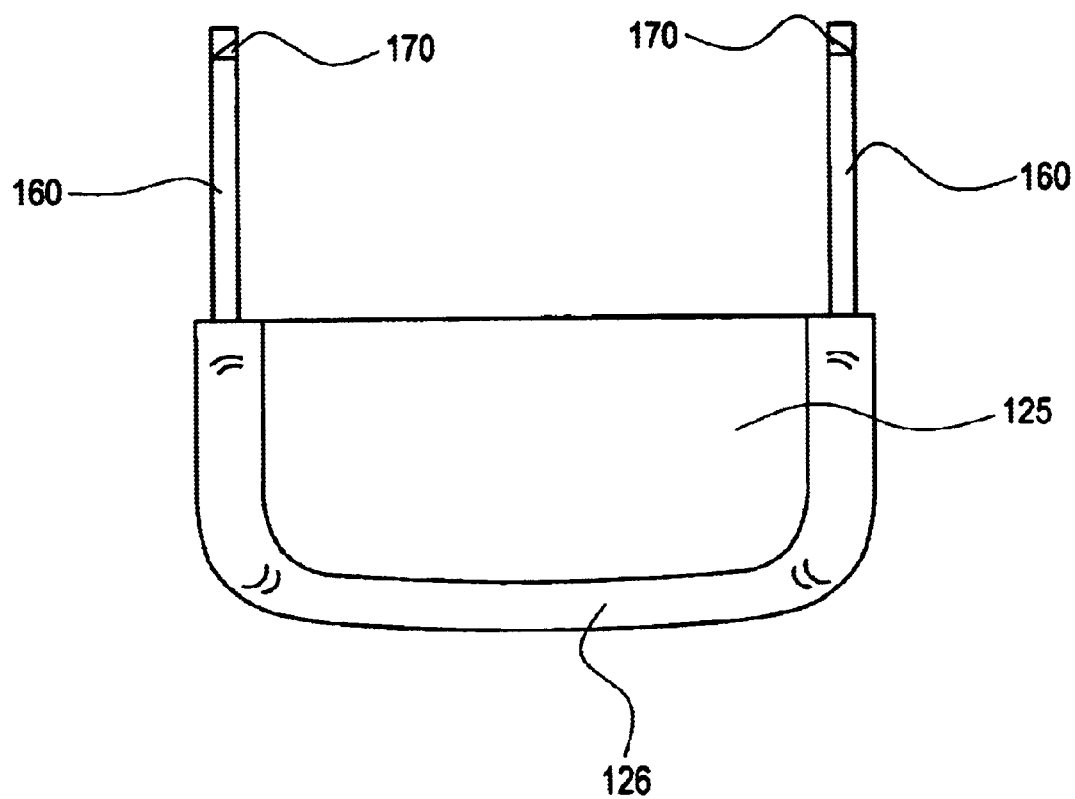
FIG. 4 is a top plan view of a keyboard and battery cover according to an embodiment of the present invention.
Figure 5:
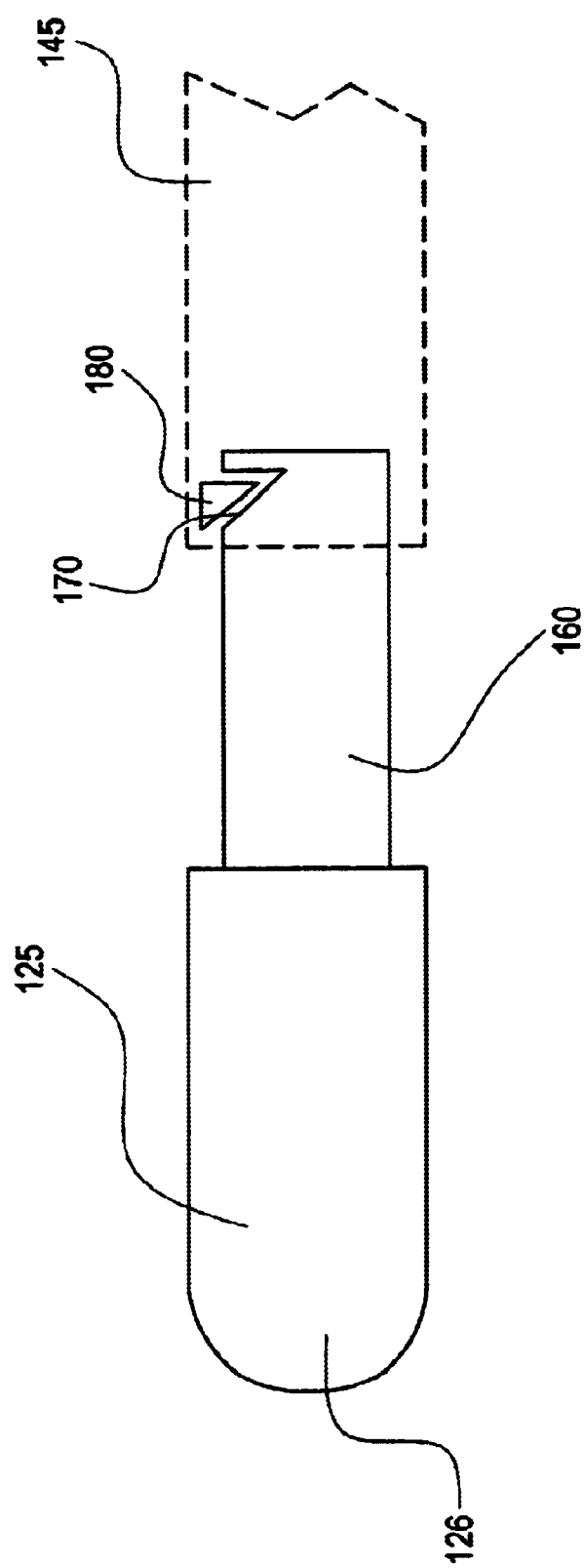
FIG. 5 is a side elevation view of a keyboard and battery cover showing the hand-held personal computer housing in phantom.

The keyboard and battery cover slide members 160 are illustrated further in FIG. 4. The slide members 160 include elongate members curved about the width of the members for sliding into the main housing 145 of the hand-held computer 100. The casing of the computer, the keyboard cover and the slide members is preferably made from magnesium or an acrylonitrile butadiene styrene (ABS) alloy. A pair of detents 170 are defined along the forward upper edges of the slide members 160 for engaging a detent catch mounted inside the main housing 145 of the hand-held computer for securing the keyboard and battery cover 125 to the main housing 145 of the hand-held computer 100. As shown in FIG. 5, the slide members 160 are inserted into the main housing 145 of the hand-held computer and are slid forward into the main housing until the keyboard and battery cover 125 encloses the keyboard 120 and battery 150, as illustrated in FIG. 1. When the keyboard and battery cover 125 is retracted, as illustrated in FIGS. 2 and 3, the spring loaded detent catch 180 engages the detent 170 to prevent the slide members 160 from being removed from the main housing 145 of the computer 100.

Figure 6:
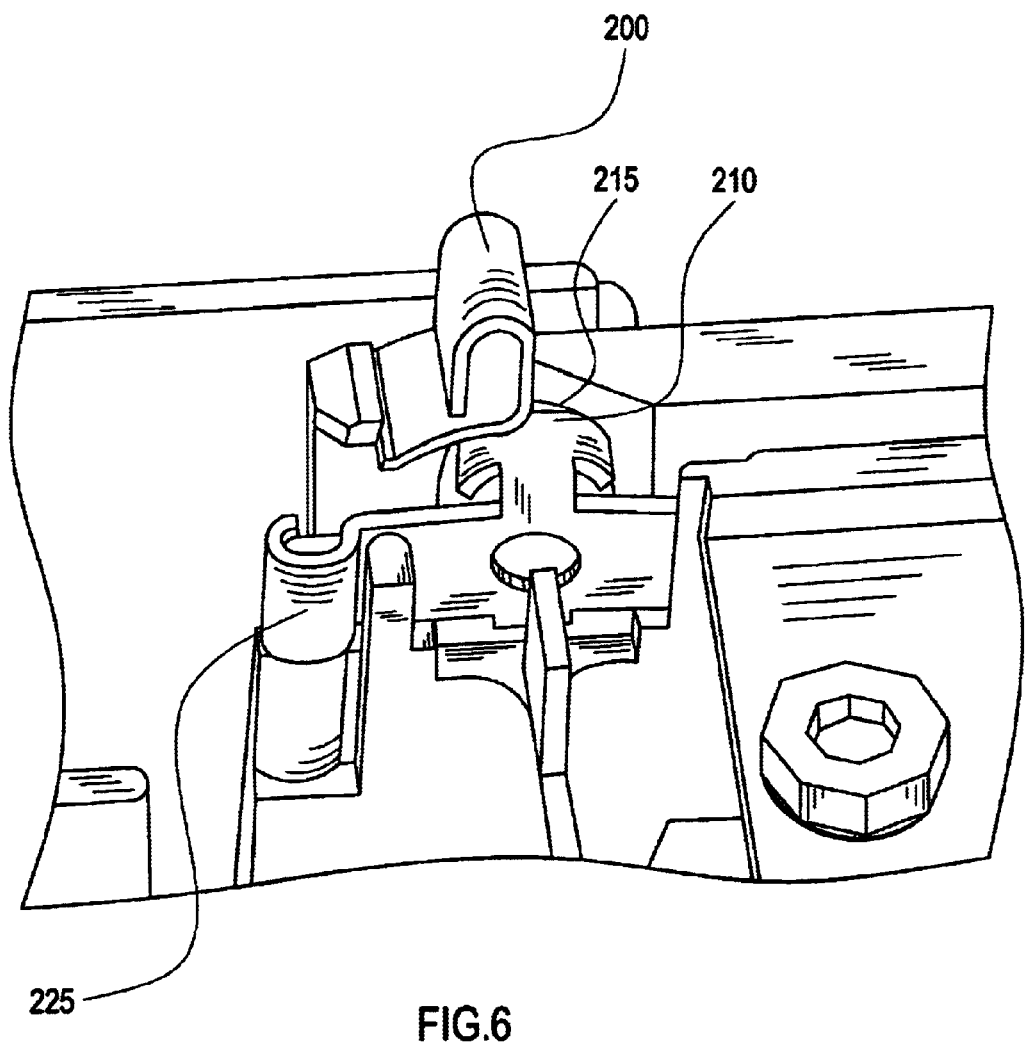
FIG. 6 is a pictorial view of a ball and bearing support assembly for allowing a keyboard and battery cover to slidably engage the housing of a hand-held personal computer.
Figure 7:
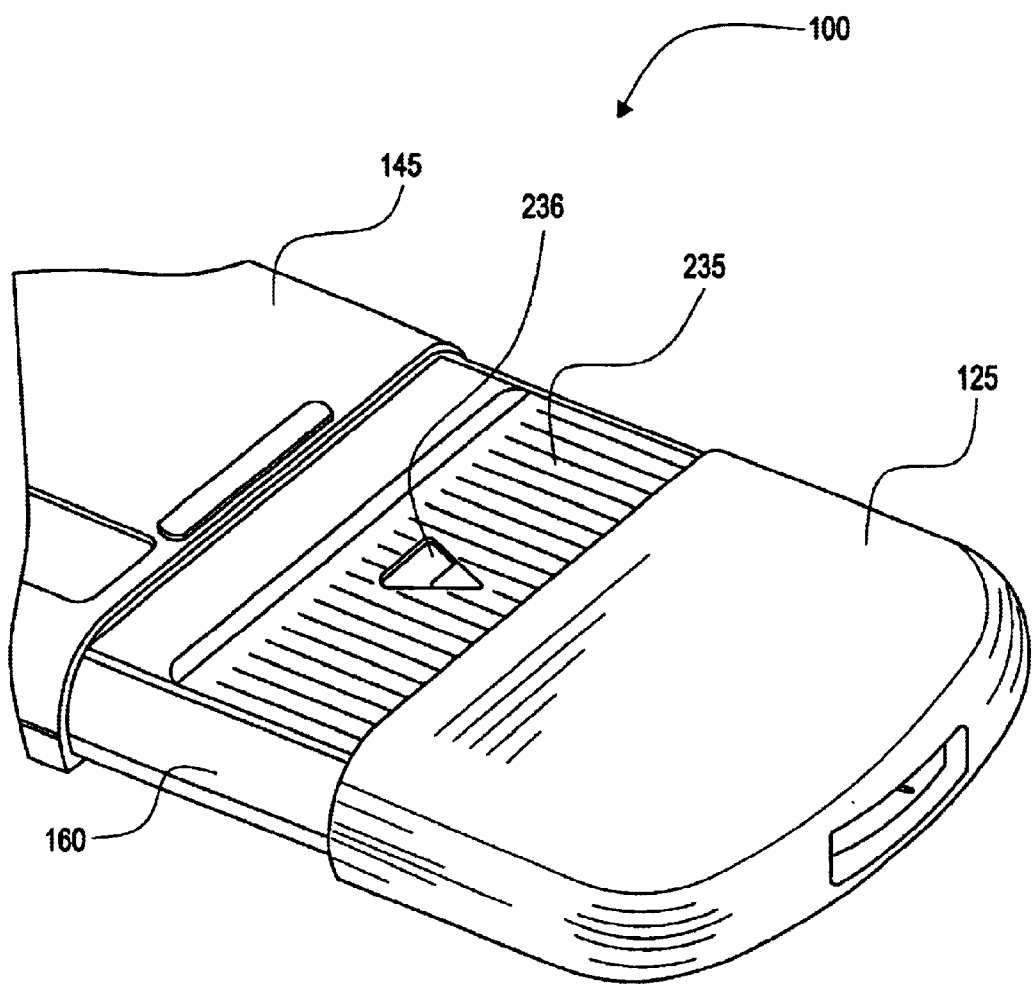
FIG. 7 is a partial pictorial view of the hand-held personal computer of FIG. 1 showing the keyboard and battery cover in a deployed position and showing an internal battery cover.

FIG. 6 is a pictorial view of a ball support assembly for allowing a keyboard and battery cover to slidably engage the housing 145 of a hand-held personal computer. For smooth and free sliding action of the keyboard and battery cover slide members 160 inside the main housing 145 of the computer 100, a ball structure is provided for engaging the inner surfaces of the slide members 160 as the slide members 160 slide in and out of the main housing 145 of the computer 100. As shown in FIG. 6, a ball 215 is urged outward by a ball support structure 210 against an inner surface of the slide member 160 by spring action of the ball support structure 210. A ball holding arm 225 provides positive engagement of the ball 215 against the inner surface of the slide member 160. Accordingly, when the slide members 160 are inserted into the main housing 145 of the computer 100 as illustrated in FIG. 5, the slide members engage the ball 215 which allow the slide members to slide in and out of the main housing 145 more efficiently. FIG. 7 is a partial pictorial view of the hand-held personal computer of FIG. 1 showing the keyboard and battery compartment cover in a deployed position and showing an internal battery cover. As illustrated in FIG. 7, the keyboard and battery compartment cover 125 is shown in the deployed position with the cover slide members 160 pulled out and away from the main housing 145 of the computer 100. With the keyboard cover in a retracted and deployed position as illustrated in FIG. 7, a slidable internal battery cover 235 is exposed. The battery cover 235 may be constructed from a light-weight plastic material molded for sliding along tracks 238 defined along upper inner edges of the keyboard and battery compartment cover slide members 160. Referring back to FIG. 7, along the upper surface of the battery cover 235, a detent 236 is defined for capturing the battery cover 235 with a user's finger to pull the internal battery cover 235 back into a retracted position. According to an embodiment of the present invention, after the keyboard and battery compartment cover 125 is retracted to the deployed position shown in FIG. 7, the internal battery cover 235 may be slid back into the retracted keyboard and battery compartment cover 125 to expose the battery 240 illustrated in FIG. 8.

Figure 8:
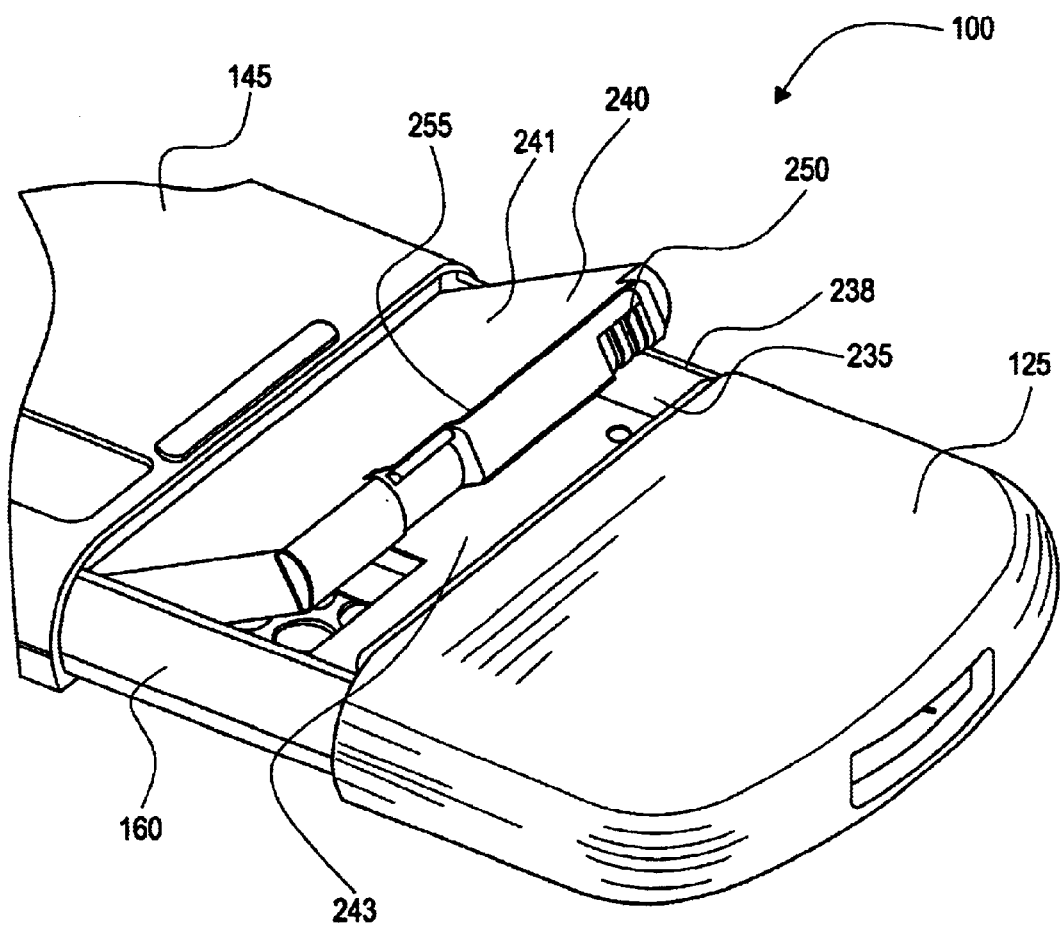
FIG. 8 is a partial pictorial view of the hand-held personal computer of FIG. 7 showing the internal battery cover in a retracted position and showing a battery in a partially removed position.

As shown in FIG. 8, the battery 240 is generally rectangular in shape with a smooth planar surface 241 for lying neatly beneath the internal battery cover 235, as illustrated back at FIG. 3. The battery 240 includes battery contacts 250 for electrically engaging corresponding mating battery contacts of the hand-held computer 100. A battery removal catch member 255 is defined along the rear upper edge of the surface 241 of the battery 240. According to an embodiment of the present invention, the battery removal catch member allows a user to gently extract the battery by catching the battery removal catch 255 with the tip of a fingernail or other similar object to gently extract the rear edge of the battery up and away from the battery compartment 243 in which the battery 240 rests during operation. This configuration is advantageous because it eliminates the need for a removal strap, as found in some prior art systems, and this configuration avoids the need for introduction of a sharp object into the battery compartment to extract the battery that may potentially damage the battery or other components of the hand-held computer 100.

Figure 9:
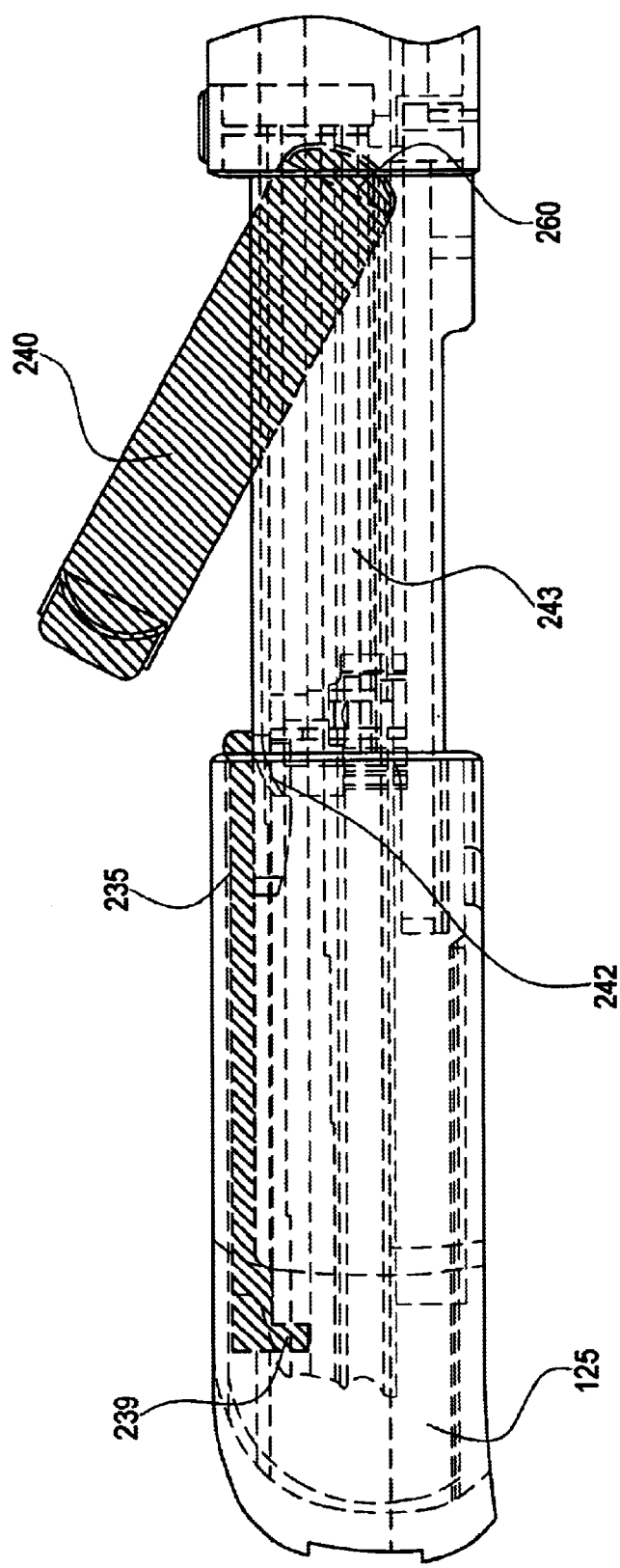
FIG. 9 is a side elevation view of the hand-held personal computer of FIG. 8 showing the casing of the hand-held personal computer in phantom and showing the battery cover in a retracted position and a partially removed battery.

FIG. 9 is a side elevational view of the hand-held personal computer of FIG. 8 showing the casing of the hand-held personal computer in phantom and showing the internal battery cover 235 in a retracted position and a partially removed battery. As shown in FIG. 9, the battery cover 235 is illustrated in a retracted position. According to an embodiment of the present invention, the battery cover 235 includes an integrated closing member 239 defined along the rear edge of the internal battery cover 235. When the battery cover 235 is in a closed position, as illustrated in FIG. 7, the member 239 engages a stop member 242 defined at the rear of the battery recess and prevents the internal battery cover 235 from traveling past a closed position within the main housing 145 of the computer 100. When the keyboard and battery compartment cover 125 and internal battery cover 235 are in a retracted and open position as illustrated in FIGS. 8 and 9, the battery cover 235 is moved to a closed position, as illustrated in FIG. 7, by pushing the keyboard and battery compartment cover 125 to a closed position and thereby urging against the battery cover closing member 239 of the internal battery cover 235 in order to move the battery cover 235 into a closed position. Once the keyboard and battery compartment cover 125 are pulled back to an open position, as shown in FIG. 7, the internal battery cover 235 remains in a closed position until opened again by the user.

Referring still to FIG. 9, a side elevational view of the battery 240 is shown with the battery 240 in a partially removed orientation. The forward edge 260 of the battery 240 is configured with a rounded edge to allow the battery 240 more easily to be removed from the battery compartment 243. That is, lifting the rear edge of the battery 240 via the battery catch member 255 allows the rounded forward edge 260 of the battery to roll upward allowing the rear edge of the battery 240 to be extracted, as shown in FIG. 9.

Figure 10:
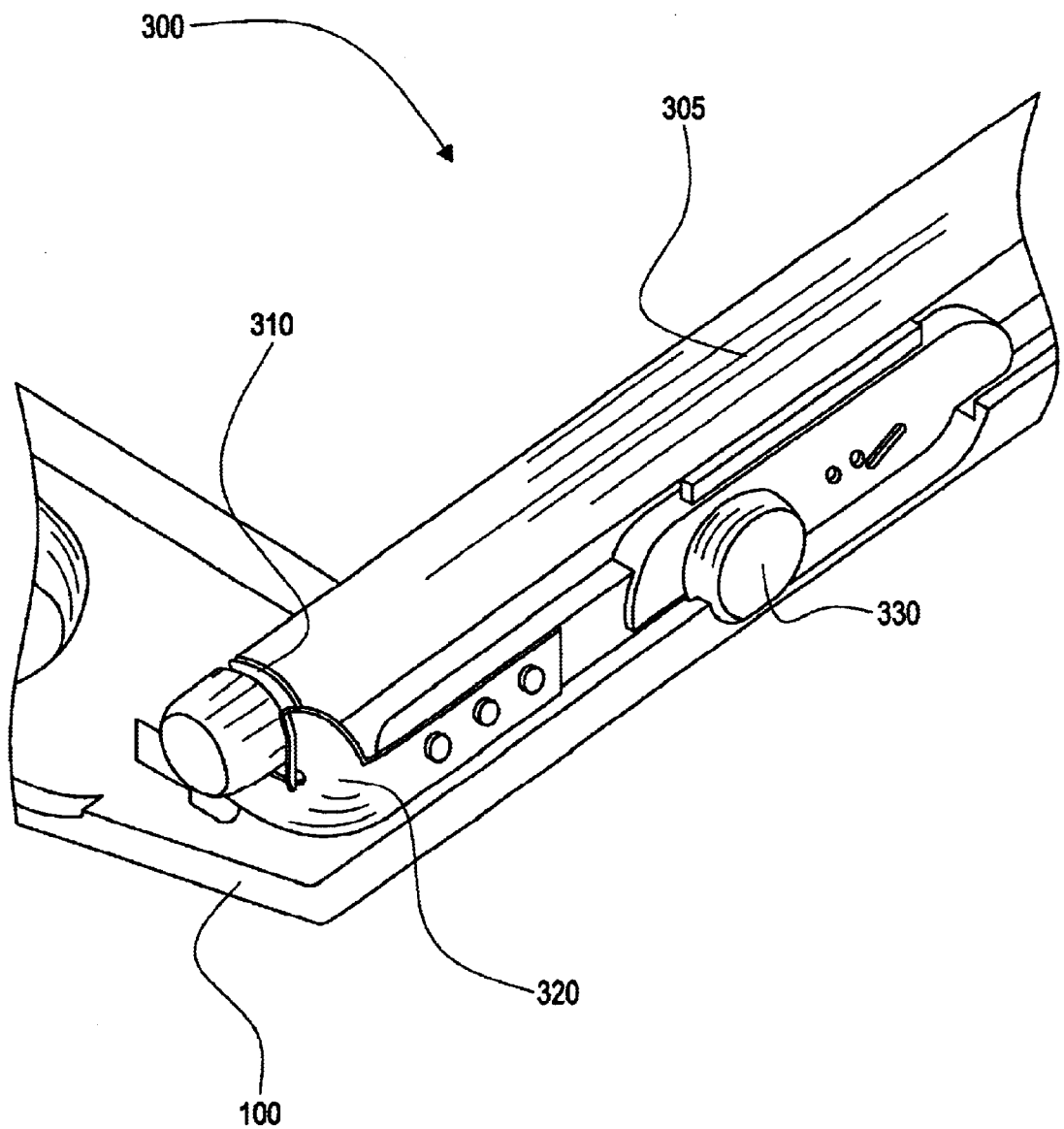
FIG. 10 is a partial pictorial view of a stylus mechanism according to an embodiment of the present invention.

FIG. 10 is a partial pictorial view of a stylus assembly 300 according to an embodiment of the present invention. As shown in FIG. 10, a stylus 305 is illustrated for use with the hand-held computer 100 of the present invention. The stylus assembly illustrated in FIG. 10 is mounted inside the elongate side edge of the hand-held computer 100 so that deployment of the stylus from the stylus assembly allows the stylus to be removed from the main casing 145 of the hand-held computer 100 along the upper edge of the hand-held computer 100 on the opposite side from the antenna 140.

Figure 11:
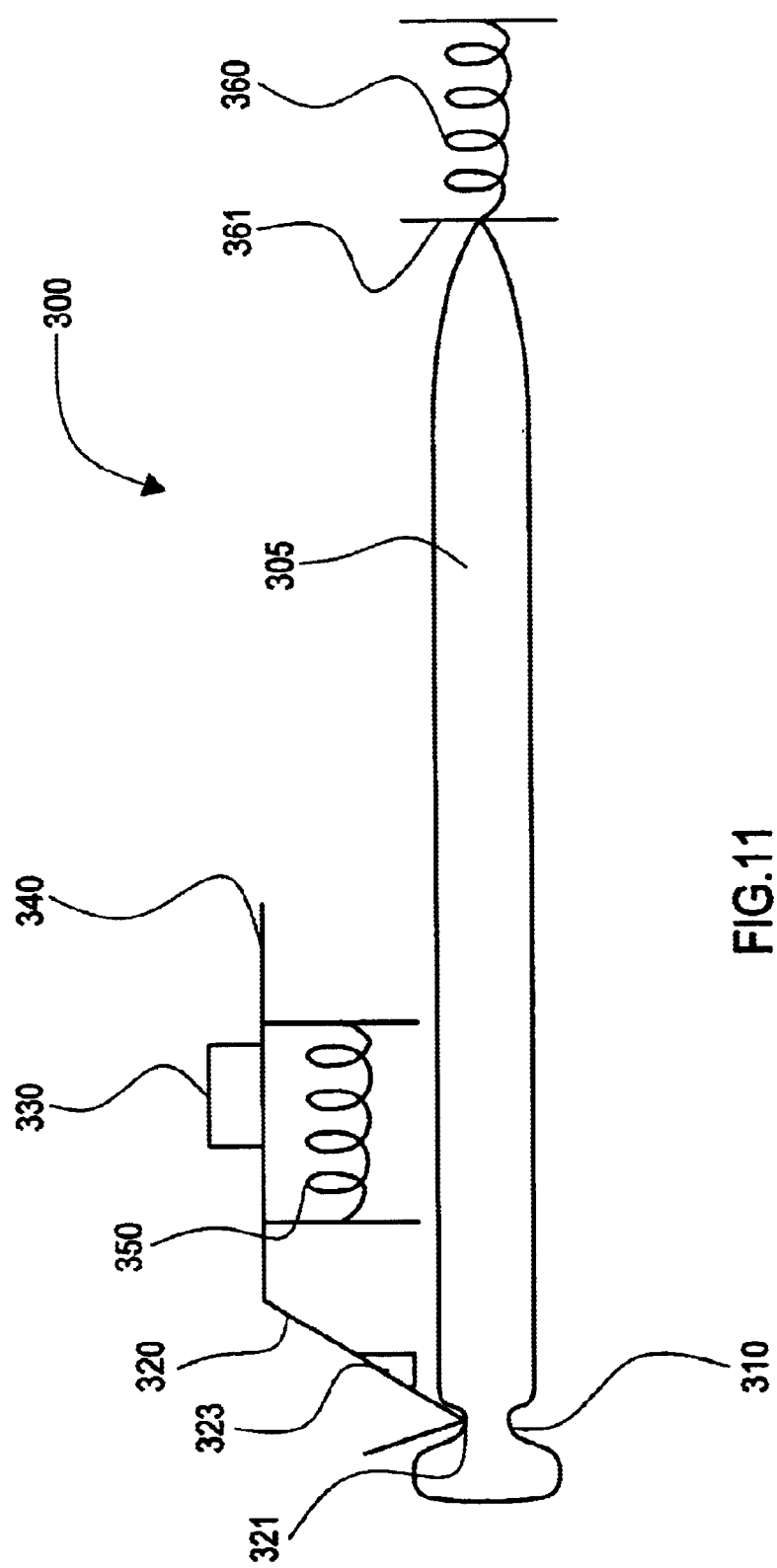
FIG. 11 is a side elevation view of a stylus mechanism according to an embodiment of the present invention.
Figure 12:
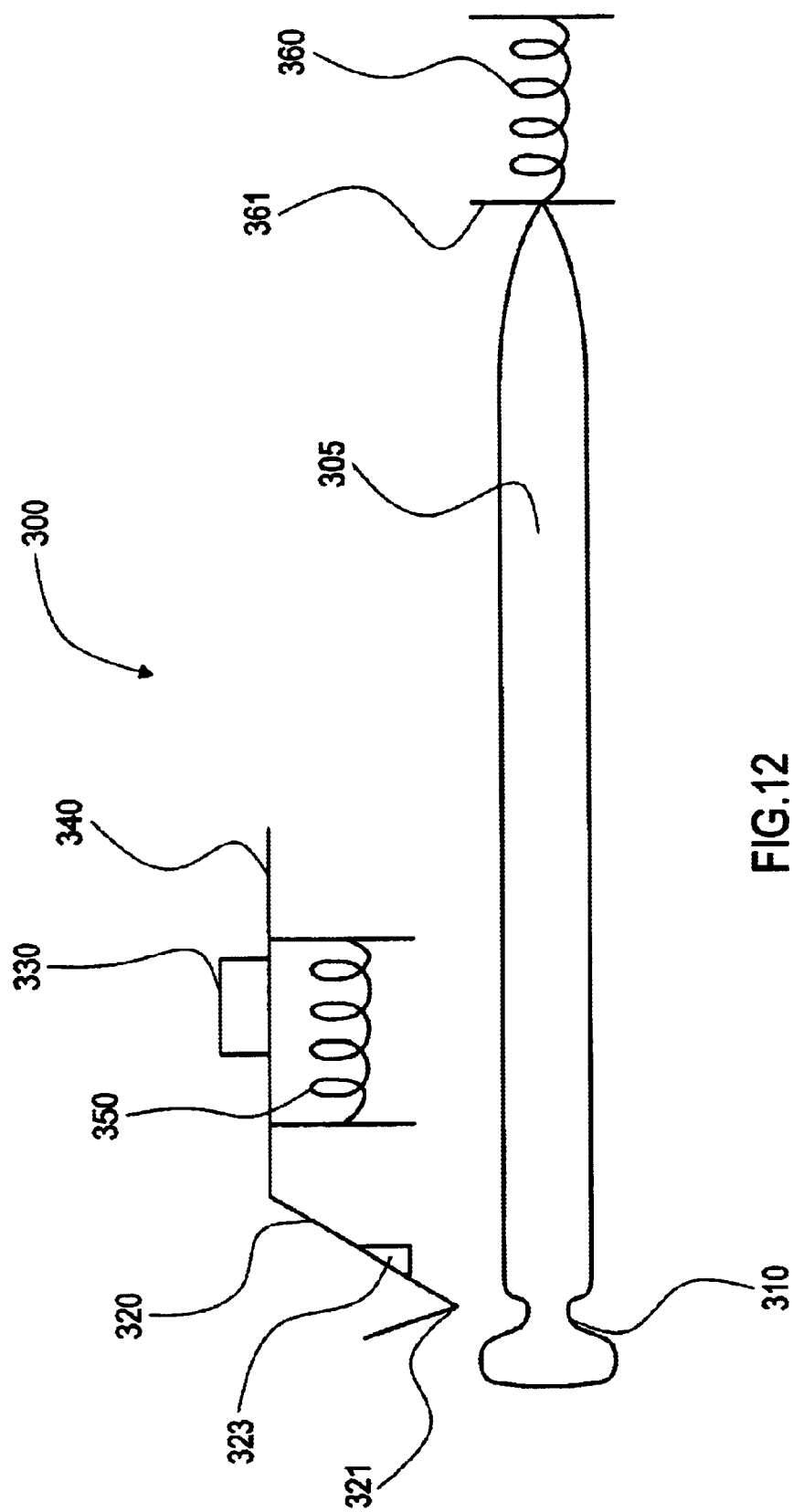
FIG. 12 is a side elevation view of the stylus mechanism of FIG. 11 showing a stylus release catch disengaged from a stylus detent.

Referring now to FIGS. 11 and 12, the stylus 305 includes a detent 310 for retaining the stylus 305 inside the main casing of the hand-held computer 100. A stylus release catch 321 at the forward end of a stylus release 320 engages the stylus detent 310 for holding the stylus 305 inside the casing of the computer 100 and for releasing the stylus 305 from the casing of the computer 100. A stylus release button 330 releases the stylus 305 by urging the stylus release button 330 downward toward the bottom edge of the hand-held computer 100. A spring guide 323 is fixed to the main casing of the hand-held computer 100. As illustrated in FIGS. 11 and 12, the spring guide 323 supports the forward section of the stylus release 320. When the stylus release is moved downward, action of the forward section of the stylus release 320 against the spring guide 323 urges the forward section of the stylus release outward and disengages the stylus release catch from the detent 310.

The stylus release 320 is integrated with a spring 350 for positively urging the stylus release 320 in an upward direction relative to the stylus 305 and for maintaining the release catch 321 in positive engagement with the stylus detent 310. A spring 360 is illustrated in engagement with the bottom tip of the stylus 305 for urging the stylus 305 outside of the casing of the hand-held computer 100.

In operation, the stylus 305 is released from the casing of the hand-held computer 100 by depressing the stylus release button 330 downward so that the forward section of the stylus release 320 is urged outward by action of the stylus release 320 against the spring guide 323, as illustrated in FIG. 12. Once the stylus release catch 321 is disengaged from the stylus detent 310, the spring 360 urges the upper spring retainer plate 361 against the lower tip of the stylus 305 to push the stylus out of the casing of the hand-held computer 100.

It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

I claim:

1. A hand-held computing device, comprising:
   a slidably retractable keyboard and battery compartment cover, the cover having a pair of elongate slide members extending from forward opposing edges of the cover, the slide members for extending into a casing of the hand-held computing device for attaching the cover to the computing device;
   a keyboard disposed along a lower front portion of the computing device; and
   a battery compartment disposed along a lower back portion of the computing device, said battery compartment configured for housing a battery and further including an interior battery cover;
   whereby the keyboard, the interior battery cover and the battery compartment are uncovered for access by slidably retracting the keyboard and battery compartment cover away from the casing of the computing device; and whereby the keyboard, the battery compartment and the battery are covered and inaccessible when the keyboard and battery compartment cover is in a closed position.

2. The computing device of claim 1, whereby the keyboard and battery compartment cover includes a hollow cavity for receiving and enclosing a lower portion of the computing device when the keyboard and battery compartment cover is in a closed position.

3. The computing device of claim 1, whereby each of the elongate slide members has a detent defined along a forward portion of the slide member for engaging a detent catch disposed in the interior of the casing for retaining the slide members from exiting from the casing and separating from the casing when the keyboard and battery compartment cover is retracted to an open position.

4. The computing device of claim 1, further comprising a pair of ball assemblies for allowing the slide members to slidably insert into and retract from the casing, each of the pair of ball assemblies including:
   a ball;
   a ball support; and
   a ball retaining arm;
   whereby the ball is maintained in engagement with an inner surface of the slide members, and
   whereby the ball retaining arm applies spring action against the ball structure for maintaining the ball in engagement with the inner surface of the slide members during movement of the slide member.

5. The computing device of claim 1, whereby the keyboard and battery compartment cover and slide members are constructed of magnesium.

6. The computing device of claim 1, whereby the battery compartment comprises:
   a generally rectangular-shaped battery recess for enclosing a battery for powering the computing device, the battery compartment further including an interior battery cover for closing the battery recess to prevent the battery from dislodging from the battery recess when the keyboard and battery compartment cover is in an open position.

7. The computing device of claim 6, whereby:
   the interior battery cover has a first side and a second side;
   each of the first and second slide members has an elongate track, the track running along a length of each of the first and second slide members along an inner side of each of the first and second slide members near an upper edge of each of the first and second slide members;
   whereby an edge of the first side of the battery cover is slidably mounted within the elongate track of the first slide member and whereby an edge of the second side of the battery cover is slidably mounted within the elongate track of the second slide member; and
   whereby the interior battery cover is slidably retractable to an open position by sliding the interior battery cover away from the battery recess and into the retracted keyboard and battery compartment cover.

8. The computing device of claim 7, whereby the interior battery cover includes a detent defined in an upper surface of the interior battery cover for retracting the interior battery cover into the open position.

9. The computing device of claim 8, whereby the interior battery cover further includes:
   an interior battery cover closing member defined along a rear edge of the interior battery cover;
   whereby the closing member is engaged by an interior surface of the keyboard and battery compartment cover such that the interior battery cover is closed by slidably closing the keyboard and battery cover and thereby pushing the closing member in a forward direction by engagement of the keyboard and battery compartment cover with the closing member.

10. The computing device of claim 9, whereby the closing member engages a stop member defined at a rear section of the battery recess to prevent the interior battery cover from moving past a closed position.

11. The computing device of claim 10, whereby the battery compartment includes a battery for powering the computing device, the battery including:
    a generally rectangular shaped battery cell, the battery cell encased by an upper surface and a lower surface and a rounded forward end member connecting a forward edge of the upper surface with a forward edge of the lower surface; and
    a battery removal member defined along a rear upper edge of the upper surface;
    whereby the battery is removed from the battery compartment by lifting the battery removal member upward and by rotating a rear end of the battery upward about an access formed along the rounded forward end member.

12. The computing device of claim 1, further comprising:
    a stylus assembly mounted in an interior portion of a casing of the computing device, the stylus assembly including:
    an elongate stylus having a first end and a second end, the stylus having a circumferentially defined detent near the second end;
    a stylus release catch for engaging the detent to retain the stylus inside the casing of the computing device;
    a spring-loaded stylus release button for disengaging the stylus release catch from the detent; and
    a lower spring assembly for engaging the first end of the stylus and for urging the stylus out of the casing of the computing device when the stylus release catch is disengaged from the detent.

13. The stylus assembly of claim 12, further comprising:

a stylus release, wherein the stylus release catch is defined at a forward end of the stylus release, and wherein the stylus release button is disposed along an outer surface of the stylus release; and a spring guide mounted in the interior portion of the casing of the computing device in engagement with an inner surface of the stylus release, whereby downward movement of the stylus release against the spring guide urges the stylus release catch outward and disengages the stylus release catch from the detent.

14. The computing device of claim 1, whereby the computing device is a hand-held personal computer.

15. The computing device of claim 1, whereby the hand-held computing device of is a personal digital assistant.

16. A hand-held computing device comprising:

a slidably retractable keyboard and battery compartment cover, the cover having a pair of elongate slide members extending from four opposing edges of the cover, the slide members for extending into a casing of the hand-held computing device for attaching the cover to the computing device;

a keyboard disposed along a lower front portion of the computing device; and a battery compartment disposed along a lower back portion of the computing device, the battery compartment including a generally rectangular-shaped battery recess for enclosing a battery for powering the computing device, the battery compartment further including an interior battery cover for closing the battery recess to prevent a battery contained in the battery recess from dislodging from the battery recess when the keyboard and battery compartment cover is in an open position;

whereby the keyboard and the interior battery cover are uncovered for access to the keyboard and the interior battery cover by slidably retracting the keyboard and battery compartment cover away from the casing of the hand-held computer.

17. The computing device of claim 16, whereby:

the interior battery cover has a first side and a second side;

each of the first and second slide members has an elongate track, the track running along a length of each of the first and second slide members along an inner side of each of the first and second slide members near an upper edge of each of the first and second slide members;

whereby an edge of the first side of the battery cover is slidably mounted within the elongate track of the first slide member and whereby an edge of the second side of the battery cover is slidably mounted within the elongate track of the second slide member; and whereby the interior battery cover is slidably retractable to an open position by sliding the interior battery cover away from the battery recess and into the retracted keyboard and battery compartment cover.

18. The computing device of claim 17, whereby the interior battery cover further includes:

an interior battery cover closing member defined along a rear edge of the interior battery cover;

whereby the closing member is engaged by an interior surface of the keyboard and battery compartment cover such that the interior battery cover is closed by slidably closing the keyboard and battery cover and thereby pushing the closing member in a forward direction by engagement of the keyboard and battery compartment cover with the closing member.

19. A hand-held computing device comprising:

a stylus assembly mounted in an interior portion of a casing of the computing device;

a slidably retractable keyboard and battery compartment cover, the cover having a pair of elongate slide members extending from four opposing edges of the cover, the slide members for extending into a casing of the hand-held computing device for attaching the cover to the computing device;

a keyboard disposed along a lower front portion of the computing device; and a battery compartment disposed along a lower back portion of the computing device, the battery compartment including a generally rectangular-shaped battery recess for enclosing a battery for powering the computing device, the battery compartment further including an interior battery cover for closing the battery recess to prevent a battery contained in the battery recess from dislodging from the battery recess if the keyboard and battery compartment cover is in an open position;

whereby the keyboard and the interior battery cover are uncovered for access to the keyboard and for access to the interior battery cover by slidably retracting the keyboard and battery compartment cover away from the casing of the hand-held computing device.

20. The computing device of claim 19, whereby the stylus assembly comprises:

an elongate stylus having a first end and a second end, the first end being generally point shaped and having a circumferentially defined detent near the second end;

a stylus release catch for engaging the detent to retain the stylus inside the casing of the computing device;

a spring-loaded stylus release button for disengaging the stylus release catch from the detent; and a lower spring assembly for engaging the first end of the stylus and for urging the stylus out of the casing of the computing device when the stylus release catch is disengaged from the detent.

21. The stylus assembly of claim 20, further comprising:

a stylus release, wherein the stylus release catch is defined at a forward end of the stylus release, and wherein the stylus release button is disposed along an outer surface of the stylus release; and a spring guide mounted in the interior portion of the casing of the computing device in engagement with an inner surface of the stylus release, whereby downward movement of the stylus release against the spring guide urges the stylus release catch outward and disengages the stylus release catch from the detent.

22. The computing device of claim 1, further comprising a battery positioned within the battery compartment such that the battery is completely encased by the slidably retractable keyboard and battery compartment cover and the casing when the keyboard and battery compartment cover is in a closed position.

23. The computing device of claim 16, further comprising a battery positioned within the battery compartment such that the battery is completely encased by the interior battery cover and portions of the casing when the slidably retractable keyboard and battery compartment cover is in a closed position or an open position.

24. The computing device of claim 16, wherein the interior battery cover is slidably retractable from a closed position to an open position.

25. The computing device of claim 24, wherein the slidably retractable interior battery cover and the slidably retractable keyboard and battery compartment cover may be each independently slidably retracted into an open position, and wherein the slidably retractable interior battery cover and the slidably retractable keyboard and battery compartment cover may be moved together into a closed position by sliding the cover into a closed position.

26. A hand-held computing device, comprising:

a slidably retractable keyboard and battery compartment cover, the cover having a pair of elongate slide members extending from forward opposing edges of the cover, the slide members for extending into a casing of the hand-held computing device for attaching the cover to the computing device;

a keyboard disposed along a lower front portion of the computing device;

a battery compartment disposed along a lower back portion of the computing device; and a pair of ball assemblies for allowing the slide members to slidably insert into and retract from the casing, each of the pair of ball assemblies including:
a ball;
a ball support; and
a ball retaining arm;

whereby (i) the ball is maintained in engagement with an inner surface of the slide members, (ii) the ball retaining arm applies spring action against the ball structure for maintaining the ball in engagement with the inner surface of the slide members during movement of the slide member, and (iii) the keyboard and the battery compartment are uncovered for access by slidably retracting the cover away from the casing of the computing device.

27. A hand-held computing device, comprising:

a slidably retractable keyboard and battery compartment cover, the cover having a pair of elongate slide members extending from forward opposing edges of the cover, the slide members for extending into a casing of the hand-held computing device for attaching the cover to the computing device;

a keyboard disposed along a lower front portion of the computing device;

a battery compartment disposed along a lower back portion of the computing device; and an interior battery cover covering at least a portion of the battery compartment to prevent a battery from dislodging from the battery compartment when the keyboard and battery compartment cover is in an open position;

wherein the keyboard and the interior battery cover are uncovered for access by slidably retracting the cover away from the casing of the computing device, and wherein the interior battery cover may be engaged into a closed position by sliding the keyboard and battery cover into a closed position.

28. A hand-held computing device, comprising:

a slidably retractable keyboard and battery compartment cover, the cover having a pair of elongate slide members extending from forward opposing edges of the cover, the slide members for extending into a casing of the hand-held computing device for attaching the cover to the computing device;

a keyboard disposed along a lower front portion of the computing device;

a battery compartment disposed along a lower back portion of the computing device;

a stylus assembly mounted in an interior portion of a casing of the computing device, the stylus assembly including:
an elongate stylus having a first end and a second end, the stylus having a circumferentially defined detent near the second end;
a stylus release catch for engaging the detent to retain the stylus inside the casing of the computing device;
a spring-loaded stylus release button for disengaging the stylus release catch from the detent; and
a lower spring assembly for engaging the first end of the stylus and for urging the stylus out of the casing of the computing device when the stylus release catch is disengaged from the detent;

whereby the keyboard and the battery compartment are uncovered for access by slidably retracting the cover away from the casing of the computing device.

* * * * *

UNITED STATES PATENT AND TRADEMARK OFFICE
CERTIFICATE OF CORRECTION

PATENT NO. : 6,744,624 B2
DATED : June 1, 2004
INVENTOR(S) : Siddiqui

It is certified that error appears in the above-identified patent and that said Letters Patent is hereby corrected as shown below:

Column 9,
Line 15, delete the word "of".

Signed and Sealed this

Twenty-third Day of November, 2004

JON W. DUDAS
*Director of the United States Patent and Trademark Office*